United States Patent
Shutt et al.

(10) Patent No.: US 7,530,073 B1
(45) Date of Patent: *May 5, 2009

(54) SYSTEMS AND METHODS FOR THE REPARTITIONING OF DATA

(75) Inventors: David R. Shutt, Bellevue, WA (US); Elizabeth Ann Nichols, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/059,828

(22) Filed: Feb. 16, 2005

Related U.S. Application Data

(63) Continuation of application No. 10/447,046, filed on May 27, 2003, now Pat. No. 6,973,654.

(51) Int. Cl.
*G06F 12/02* (2006.01)
*G06F 9/50* (2006.01)

(52) U.S. Cl. .................. 718/105; 709/213; 709/215; 711/165; 718/104

(58) Field of Classification Search .................. None
See application file for complete search history.

(56) References Cited

U.S. PATENT DOCUMENTS

| | | | |
|---|---|---|---|
| 5,991,804 A | 11/1999 | Bolosky et al. | 709/221 |
| 6,108,703 A | 8/2000 | Leighton et al. | 709/226 |
| 6,314,503 B1 | 11/2001 | D'Errico et al. | |
| 6,718,361 B1 | 4/2004 | Basani et al. | 709/201 |
| 6,779,078 B2 | 8/2004 | Murotani et al. | |
| 6,785,792 B2 | 8/2004 | Katsurashima | |
| 6,895,483 B2 | 5/2005 | Eguchi et al. | |

OTHER PUBLICATIONS

Candan, K.S. et al., "Enabling Dynamic Content Caching for Database-Driven Web Sites", *Proceedings of the 2001 ACM SIGMOND International Conference on Management of Data*, 2001, Santa Barbara, California, 532-543.

(Continued)

*Primary Examiner*—Gary J Portka
(74) *Attorney, Agent, or Firm*—Woodcock Washburn LLP

(57) ABSTRACT

Various embodiments of the present invention are directed toward extending a federation of servers and balancing the data load of said federation of servers, in order to improve accessibility and scope of the system by moving the first backup data structure on the second server to the new server, creating a second data structure on the new server, and creating a second backup data structure for the second data structure on the second server. To balance the load, certain embodiments employ a method comprising suspending writes to the selected logical partitions, copying selected logical partitions to the new physical partition, redirecting reads and writes to the logical partitions in the new physical partition, and removing the original selected logical partitions. Alternative embodiments for balancing data load comprise the substitute steps of creating a temporary replication stream for the selected logical partitions to the new physical partition, copying selected logical partitions to the new physical partition, deconflicting inconsistencies in the logical partitions on the new physical partition, redirecting reads and writes for the selected logical partitions to the logical partitions in the new physical partition, and removing the original selected logical partitions that were copied to the new physical partition.

20 Claims, 13 Drawing Sheets

OTHER PUBLICATIONS

Carreira, J.V. et al., "Dependable Clustered Computing", *High Performance Cluster Computing: Architectures and Systems*, vol. 1, 1999, 94-115.

Chase, J.S. et al., "Managing Energy and Server Resources in Hosting Centers", *Proceedings of the 18ACM Symposium on Operating Systems Principles*, 2001, Banff, Alberta, Canada, 103-116.

Dove, K. "Expanding Options for Clustering", *Linux Journal*, 2001, Issue 82es, Article No. 8, 3 pages.

Fox, A. et al., "Cluster-Based Scalable Network Services", *Proceedings of the Sixteenth ACM Symposium on Operating Systems Principles*, 1997, Saint Malo, France, 78-91.

Lahiri, T. et al., "50,000 Users on an Oracle8 Universal Server Database", *Proceedings of ACM SIGMOD International Conference on Management of Data*, 1998, Seattle, Washington, 528-530.

Lewis, P. "A High-Availability Cluster for Linux", *Linux Journal*, 1999, Issue 64es, Article No. 25, 11 pages.

Stonebraker, M. et al., "Content Integration for E-Business", *Proceedings of the 2001 ACM SIGMOD International Conference on Management of Data*, 2001, Santa Barbara, California, 552-560.

Zhou, Y. et al., "First Cluster Failover Using Virtual Memory-Mapped Communication", *Proceedings of the 1999 International Conference on Supercomputing*, 1999, Rhodes, Greece, 373-382.

Zhuang, S.Q. et al., "Bayeux: An Architecture for Scalable and Fault-tolerant Wide-area Data Dissemination", *11th International Workshop on Network and Operating Systems Support for Digital Audio and Video*, 2001, Port Jefferson, New York, 11-20.

In the United States Patent and Trademark Office, In re U.S. Appl. No. 10/447,046, filed May 27, 2003, Dated Aug. 12, 2005, Notice of Allowance and Fee(s) Due, 6 pages.

In the United States Patent and Trademark Office, In re U.S. Appl. No. 10/447,046, filed May 27, 2003, Dated Jun. 30, 2005, Final Office Action, 7 pages.

In the United States Patent and Trademark Office, In re U.S. Appl. No. 10/447,046, filed May 27, 2003, Dated Dec 6, 2004, Non-Final Office Action, 8 pages.

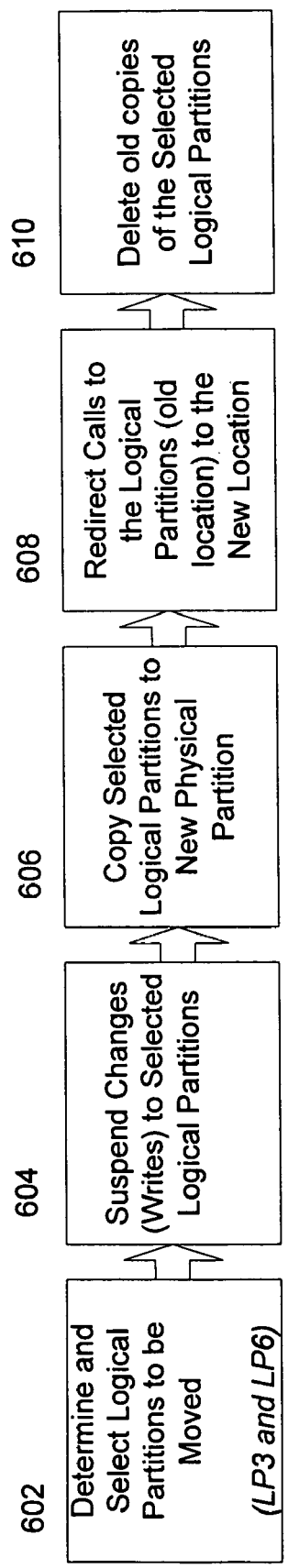

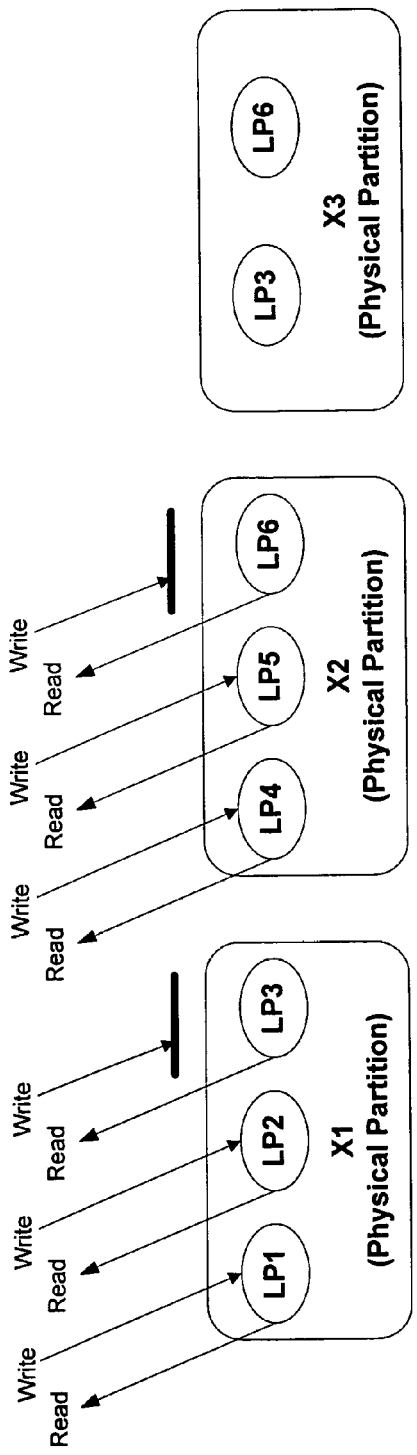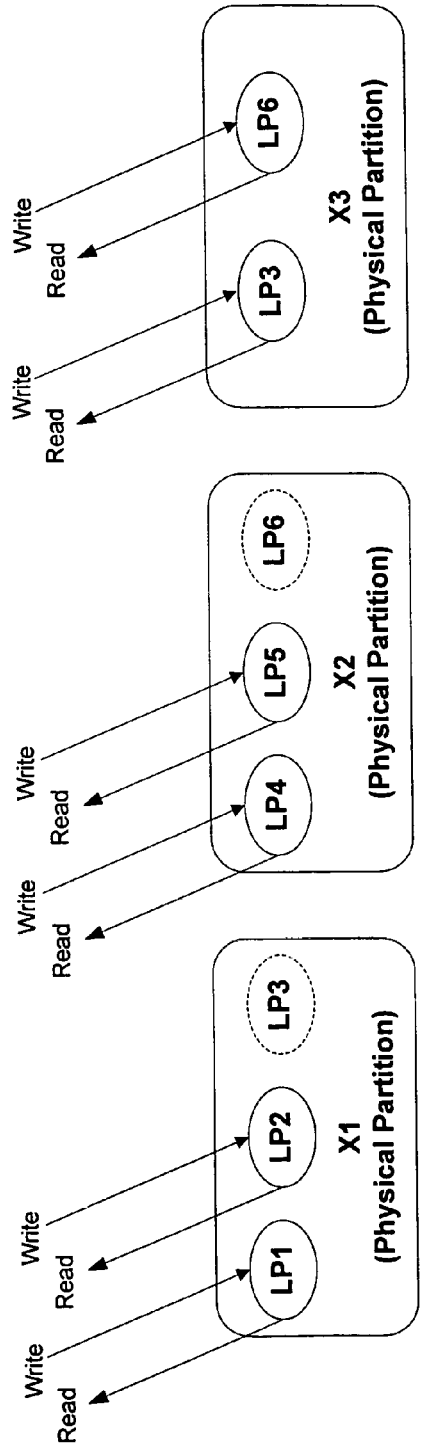

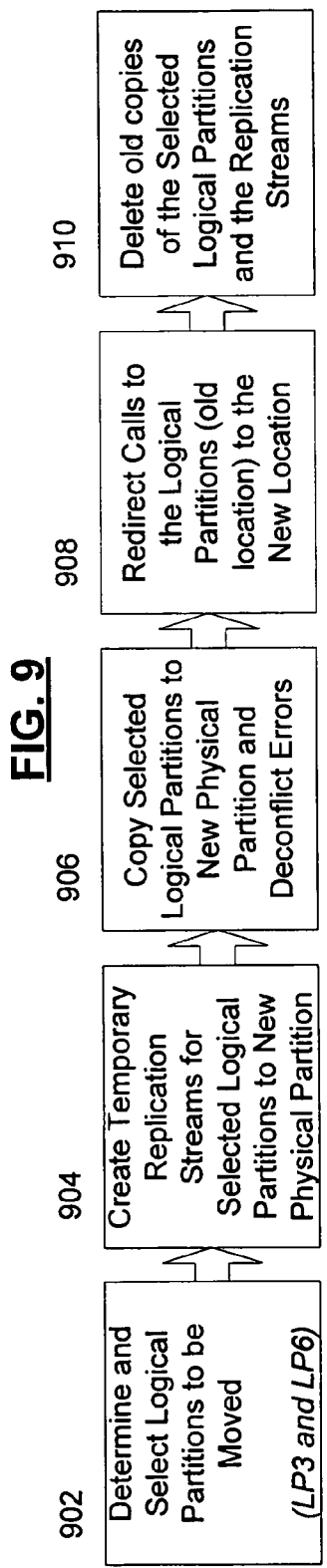
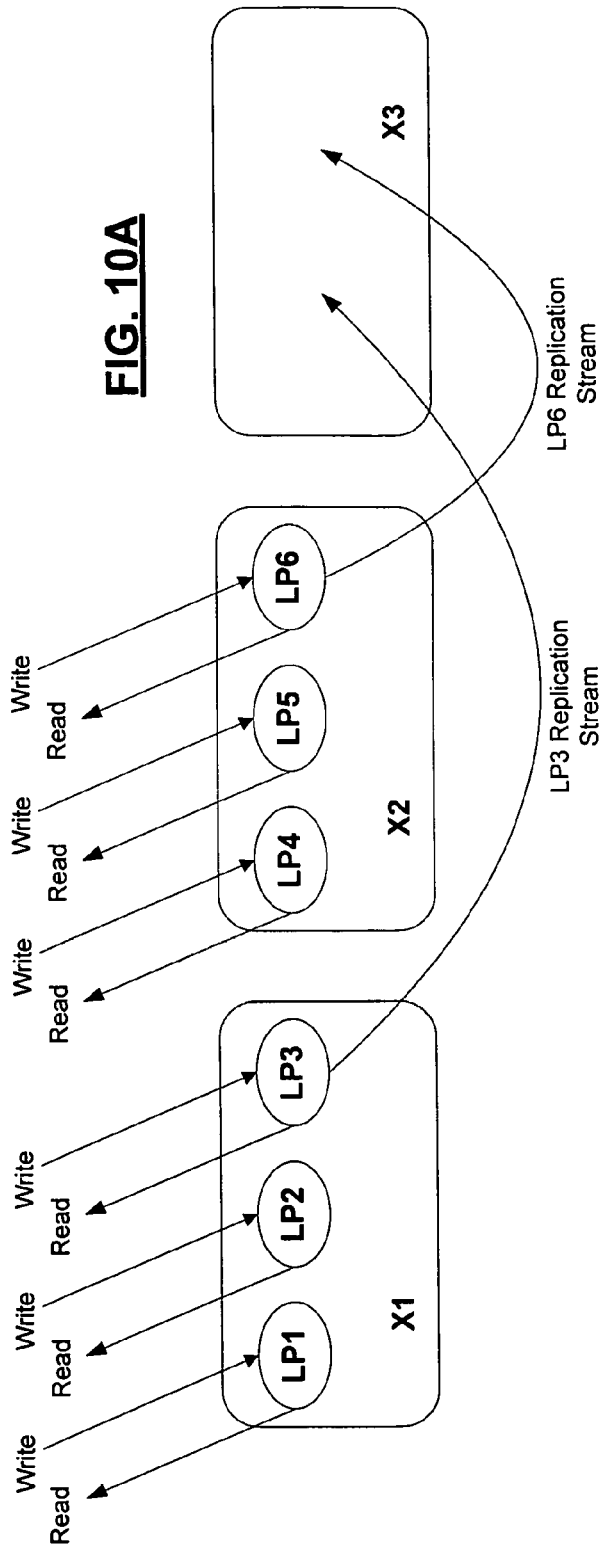

SYSTEMS AND METHODS FOR THE REPARTITIONING OF DATA

CROSS REFERENCE TO RELATED APPLICATIONS

This application is a continuation of U.S. application Ser. No. 10/447,046, filed May 27, 2003, now U.S. Pat. No. 6,973,654 now pending, which is hereby incorporated by reference in its entirety. Additionally, this application is related to U.S. patent application No. 10/447,046 filed on May 27, 2003, now U.S. Pat. No. 6,973,654; U.S. patent application No. 11/125,048 filed on May 9, 2003, now U.S. Pat. No. 7,150,022; and U.S. patent application No. 11/225,626 filed on Sep. 13, 2005.

FIELD OF THE INVENTION

The present invention relates generally to the fields of data management, and more particularly to load and space balancing in a federation of data servers. The invention, however, is not limited to use in a federation of data servers; on the contrary, the invention could be used in a variety of other contexts related to distributed data storage.

BACKGROUND OF THE INVENTION

A significant challenge of data management is to achieve both high scale and high availability while minimizing capital and operational costs.

In stateless data systems, such as web page servers where data is largely static (e.g., where reads are far more frequent than writes), one solution (referred to herein as the "distributed copy method") is to produce many identical copies (hereinafter "copies") of the "master data" (hereinafter "master"), store these copies in different accessible locations (e.g., a federation of servers), and then enable users to read-access any of the copies directly. When changes to the data are required, such changes are made to the master and are eventually (and perhaps automatically) propagated to all of the copies. While changes to the master may take time to propagate to each of the copies—and certain users may in fact access outdated data during this intervening period—this is an acceptable tradeoff to achieve high scale and high availability for data that is stateless. System-wide scale and availability can be achieved by adding more servers with additional copies thereon, and greater scale is achieved because now the data system can route a data request to one of the increased number of copies.

In stateful data systems, such as SQL server systems where data is dynamic (e.g., where reads and writes are logically and temporally intertwined, and a subsequent read may be logically related to a previous write), the distributed readable copy method is inadequate. For example, in a stateful system comprising one master and many copies, and wherein changes (writes) to the data are frequent, any change written to the master (or directly to a copy if such functionality is allowed) must be fully propagated across all of the copies before further processing of the data (master or copy) can occur. However, as is well-known and appreciated by those of a skill in the relevant art, this brute force approach to real-time updating of the data would consume too many resources and therefore have a significant negative impact on overall system performance. Furthermore, given the high volumes of data and/or high transaction rates of many stateful systems, maintaining numerous identical copies of all the data in various locations is neither technically nor economically feasible.

Moreover, unlike stateless data systems where adding a new server and putting a new copy of the master data thereon immediately increases the scale of the system, utilization of a new server in a federation of servers for a stateful data system requires a more inventive approach.

There has been a long-felt need in the art for the development of a stateful data management system that can achieve both high scale and high availability while continuing to minimize capital and operational costs. The present invention provides solutions to meet this need.

SUMMARY OF THE INVENTION

Various embodiments of the present invention are directed toward extending a federation of servers and balancing the data load of said federation of servers, in order to improve accessibility and scope of the system by moving the first backup data structure on the second server to the new server, creating a second data structure on the new server, and creating a second backup data structure for the second data structure on the second server. To balance the load, certain embodiments employ a method comprising suspending writes to the selected logical partitions, copying selected logical partitions to the new physical partition, redirecting reads and writes to the logical partitions in the new physical partition, and deleting the selected logical partitions from the original physical partition. Alternative embodiments for balancing data load comprise the substitute steps of creating a temporary replication stream for the selected logical partitions to the new physical partition, copying selected logical partitions to the new physical partition, deconflicting inconsistencies in the logical partitions on the new physical partition, redirecting reads and writes for the selected logical partitions to the logical partitions in the new physical partition, and removing the original selected logical partitions that were copied to the new physical partition.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 is a flowchart representing one method for balancing the data load in a federation of servers after the addition of a new server.

FIG. 7C is a block diagram illustrating the copying of the selected logical partitions (LP3 and PL6 from physical partitions X1 and X2 respectively) to the new physical partition X3.

FIG. 7D is a block diagram illustrating the redirection of read and write to the new location for the moved physical partitions and the deletion of the logical partitions in their original locations.

FIG. 9 is a flowchart representing an alternative method for balancing the data load in a federation of servers after the addition of a new server.

FIG. 10A is a block diagram of the physical partitions of the extended federation of servers (including the newly-created X3 physical partition) and of the establishment of temporary replication streams from the selected logical partitions to the new physical partition X3.

DETAILED DESCRIPTION OF ILLUSTRATIVE EMBODIMENTS

Introduction and Overview

Figure 1:
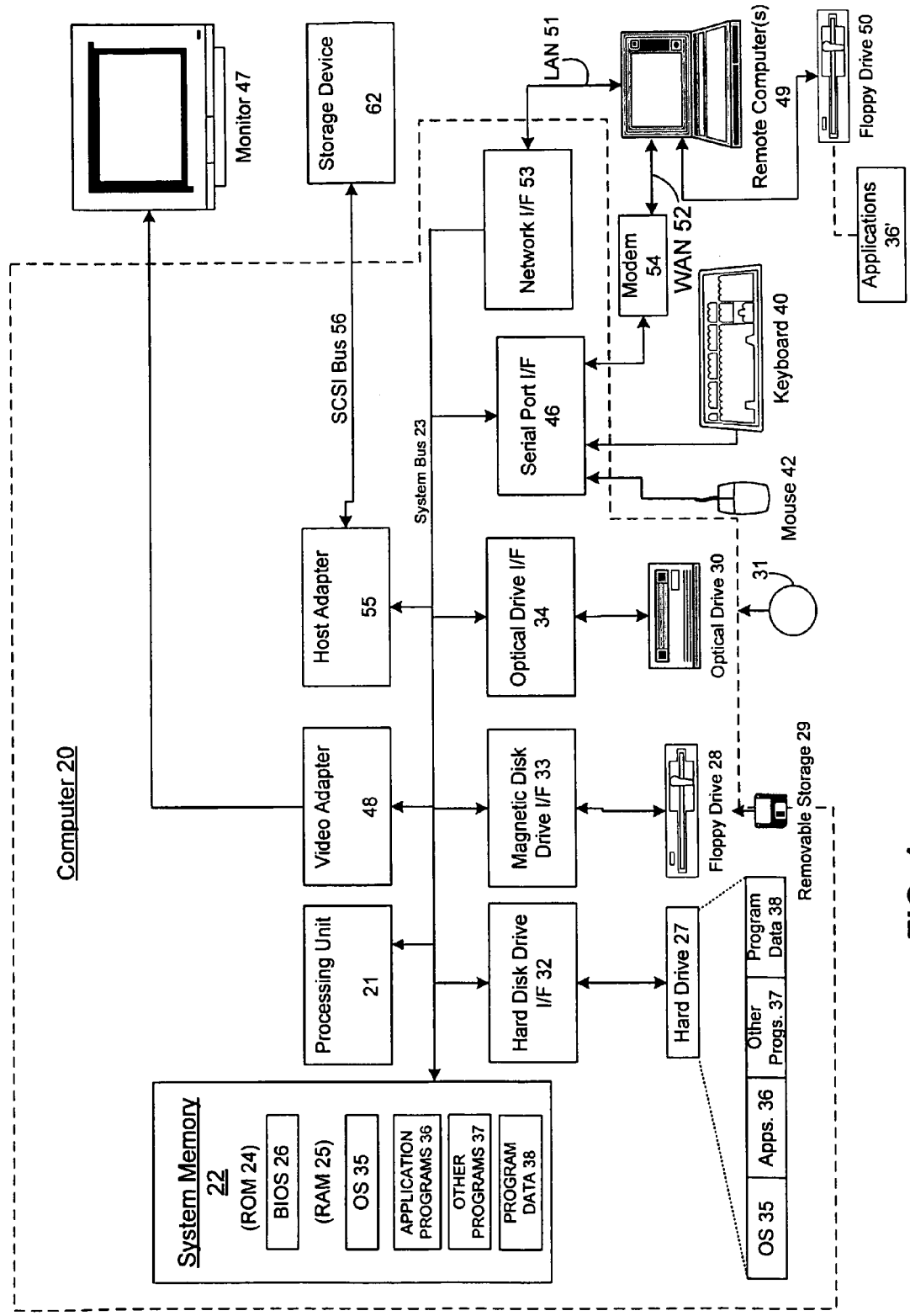
FIG. 1 is a block diagram representing a computer system in which aspects of the present invention may be incorporated.

Various embodiments of the present invention comprise systems, methods, and products for extending the capacity of a federation of servers comprising at least two servers, wherein a first set of data in a first data structure (for example, and without limitation, a database, set of files, collection of data) is stored on a first server, and a backup of the first set of data in a first backup data structure is stored on a second server. Many of the aforementioned embodiments comprise the steps of adding a new server; moving the first backup data structure on the second server to the new server; creating a second data structure on the new server; and creating a second backup data structure for the second data structure on the second server. The first data structure and the first backup data structure together comprise a first physical partition, and the second data structure and the second backup data structure comprise a second physical partition. Moreover, each physical partition comprises a plurality of logical partitions which, in turn, comprise a subset of the data in the data structures.

Other embodiments of the present invention comprise systems, methods, and products for balancing data load on the federation of servers extended by the technique described above and comprise the steps of determining a quantity of logical partitions to be moved to the new physical partition and selecting the specific logical partitions to be moved; suspending writes to the selected logical partitions; copying selected logical partitions to the new physical partition; redirecting reads and writes to the logical partitions in the new physical partition; and removing the original selected logical partitions.

Alternative embodiments for balancing data load on the federation of servers are also herein disclosed and comprise the steps of determining a quantity of logical partitions to be moved to the new physical partition and selecting the specific logical partitions to be moved; creating a temporary replication stream for the selected logical partitions to the new physical partition; copying selected logical partitions to the new physical partition; deconflicting inconsistencies in the logical partitions on the new physical partition; redirecting reads and writes for the selected logical partitions to the logical partitions in the new physical partition; and removing the original selected logical partitions that were copied to the new physical partition.

These various embodiments are described more fully herein below. The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, the term "data structure" used herein is intended to have the broadest meaning and, for purposes of this application, expressly includes any database, set of files, or collection of data regardless of structure or form.

Moreover, although the term "step" is used herein to connote different elements of methods employed, the term should not be interpreted as implying any particular order among or between various steps herein disclosed unless and except when the order of individual steps is explicitly described.

Computer Environment

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Network Environment

Figure 2:
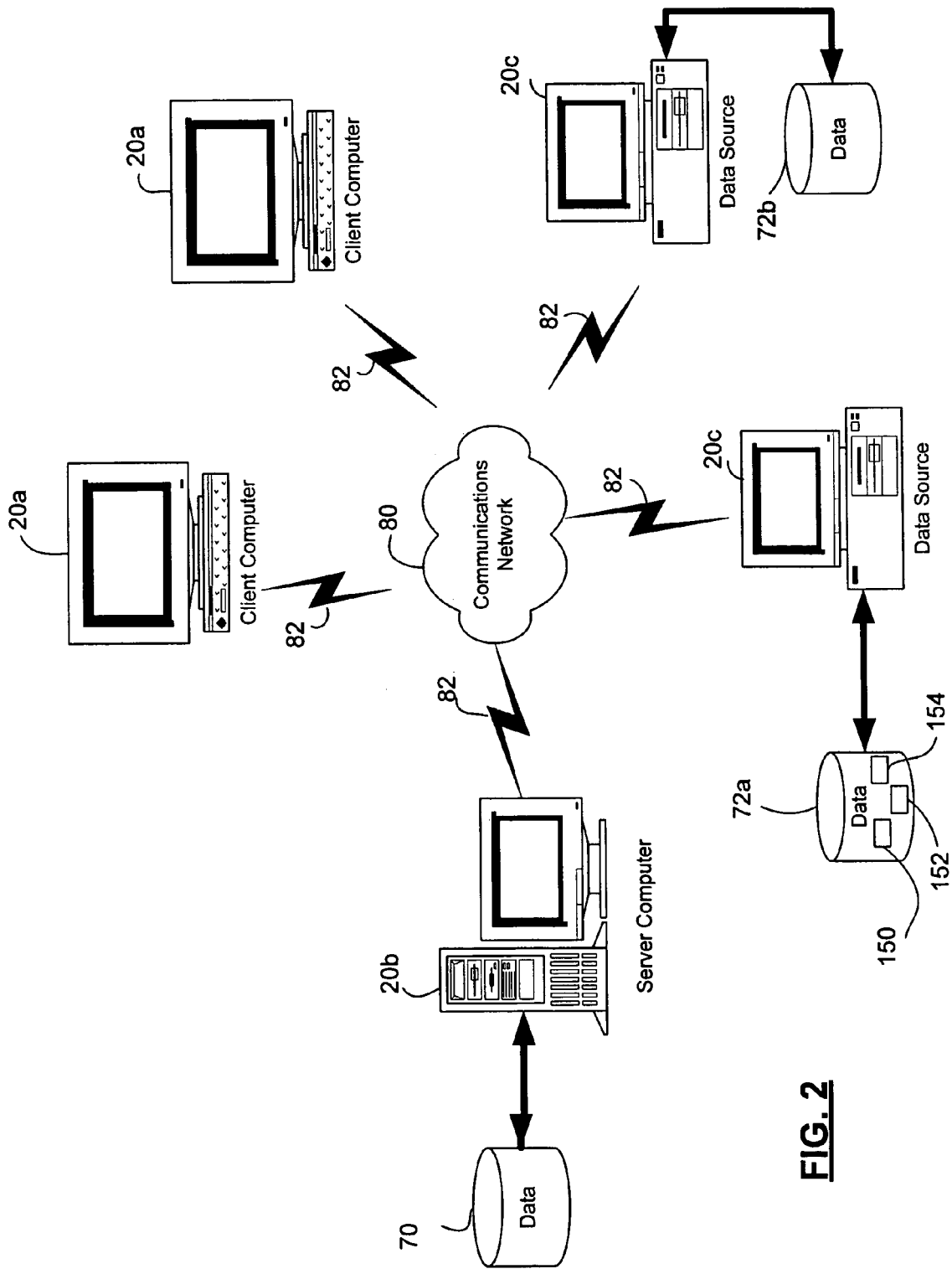
FIG. 2 is a schematic diagram representing a network in which aspects of the present invention may be incorporated.

FIG. 2 illustrates an exemplary network environment in which aspects of the present invention may be employed. Of course, actual network and data structure environments can be arranged in a variety of configurations; however, the exemplary environment shown here provides a framework for understanding the type of environment in which the present invention operates.

The network may include client computers 20a, a server computer 20b, data source computers 20c, and data structures 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of data structure 70 by way of data structure server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in data structures 72a, 72b, which may be relational data structure servers, EXCEL spreadsheets, files, or the like. For example, data structure 72a shows data stored in tables 150, 152, and 154. The data provided by data sources 20c is combined and stored in a large data structure such as a data warehouse maintained by server 20b. Client computers 20a that desire to use the data stored by server computer 20b can access the data structure 70 via communications network 80. Client computers 20a request the data by way of SQL queries (e.g., update, insert, and delete) on the data stored in data structure 70.

Overview of the Data Structure

In many embodiments of the present invention, the collective data ("Data") of a stateful data system ("System") is divided into a large fixed number of logical partitions, and these numerous logical partitions are then distributed across a smaller but variable number of physical partitions (such that each physical partition contains a large but relatively equal number of logical partitions). Each physical partition may comprise a number of data structures equal to the "redundancy level" of the Data, the first such data structure for each such physical partition being the primary data structure, and the other data structures (if any) constituting backup data structures to maintain identical copies of the primary data structure. The redundancy level of the Data is the fixed number of copies of data that are maintained in the System; for example, if the Data comprises primary data and two backup copies thereof, then the redundancy level is equal to three and, thus, each physical partition would comprise three data structures. In certain embodiments, the redundancy level may also be considered to be the minimum number of servers required for the System. In any event, the minimum redundancy level is one, in which case the scaling and load balancing benefits described later herein are utilized independent of the foregoing method for extending the System to increase availability.

Logical partitions comprise the primary data and corresponding backup data for a relatively small subset of the Data and thereby comprise the smallest amount of data moved in the System at any given time. By dividing the Data into a large number of logical partitions, the percentage of Data in the System being moved at any given time is quite small. For example, if a System utilizes 20,000 logical partitions, then only 0.005% of the data might participate in the move process, thus minimizing the additional load due to rebalancing and any possible impact on availability. In any event, the maximum possible number of logical partitions is equal to the number of items in the Data.

Physical partitions comprise physical storage components across a number of servers equal to the redundancy level of the Data. For numerous embodiments of the present invention, the number of physical partitions corresponds to the number of servers in a system, these servers together comprising "a federation of servers" for that system. Moreover, as will become clear later herein, it is important to note that the number of physical partitions in such embodiments will change—increase or decrease—as the number of servers in the System change. In any case, physical partitions comprise one primary data structure that resides on one server (that physical partitions's "primary server"), and a number of backup data structures, one less than the redundancy of the data, that reside on other servers to achieve true data redundancy and thereby protect accessibility against single-server failures.

Extending the Data System

Figure 3:
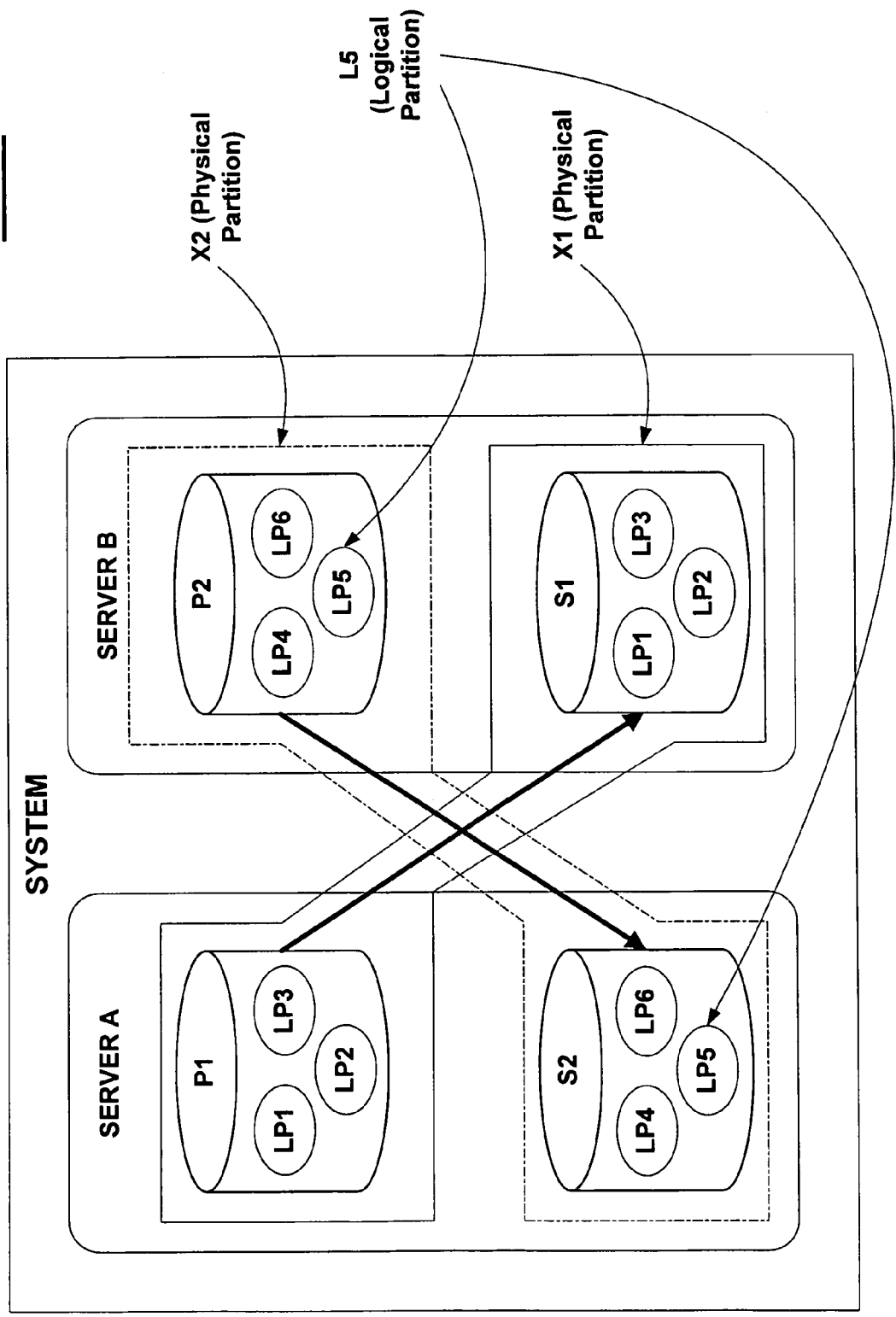
FIG. 3 is a block diagram illustrating the structure of the system and the interrelationship between data, servers, physical partitions, logical partitions, primary data structures, and backup data structures.

In many embodiments of the present invention, the Data, servers, physical partitions, logical partitions, and various primary and backup data structures together comprise an interrelated structure inherent to the System. FIG. 3 illustrates the structure of the System and the interrelationship between Data, servers, physical partitions, logical partitions, primary data structures, and backup data structures. (Again, the term "data structure" used herein is intended to have the broadest meaning and, for purposes of this application, expressly includes any set of files or collection of data regardless of structure or form.)

In this figure, a simple stateful data system ("System") comprises two servers: Server A and Server B. Server A comprises data structures P1 and S2; and Server B comprises data structures P2 and S1. Data structure P1, a primary data structure, and data structure S1, the secondary data structure (and the backup copy of data structure P1), together comprise physical partition X1. Likewise, data structure P2, a primary data structure, and data structure S2, the secondary data structure (and the backup copy of data structure P2), together comprise physical partition X2. The servers in this embodiment, like those in other embodiments, may be physically located in geographically disparate locations in order to enhancing enhance the availability of the Data in the event of a catastrophic event such as fire, earthquake, flood, tornado, hurricane, and so and so forth; as such, nothing herein is intended to limit the servers of any embodiment to having to occupy a common geographic location.

Physical partition X1, and its data structures P1 and S1, comprise logical partitions LP1, LP2, and LP3, the primary data of which is stored in the P1 data structure and the identical backup or secondary data of which is stored in the S1 data structure. Likewise, physical partition X2, and its data structures P2 and S2, comprise logical partitions LP4, LP5, and LP6, the primary data of which is stored in the P2 data structure and the identical backup or secondary data of which is stored in the S2 data structure. It is also important to note that, for example, logical partition LP1 comprises both the primary component located in data structure P1 (the primary data) and the backup component located in data structure S1 (the secondary data). Since primary data structures and secondary (backup) data structures are not stored on the same server, each logical partition for this set of embodiments necessarily comprises data located on more than one server. For example, if logical partition L1 has primary data in primary data structure P1 on Server A, then logical partition L1 also has secondary data in secondary data structure S1 on Server B. In other alternative embodiments, S1 and S2 could be located on separate servers C and D (not shown).

Figure 4:
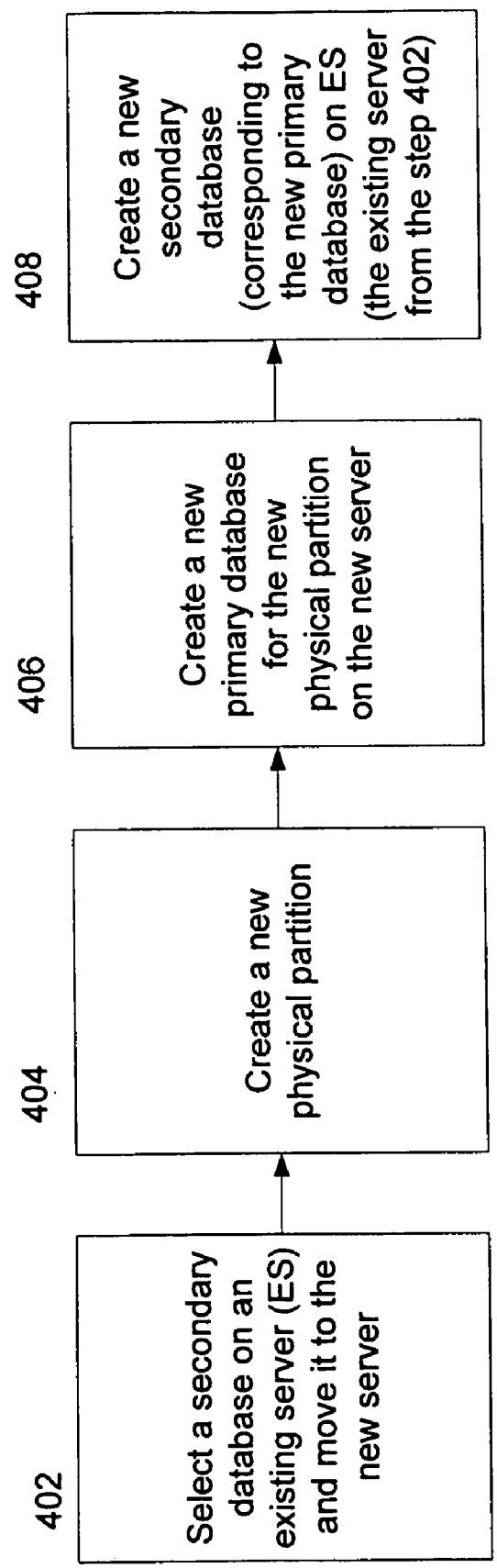
FIG. 4 is a flowchart representing the method of extending a federation of servers by adding and integrating a new server to a plurality of existing servers.
Figure 5A:
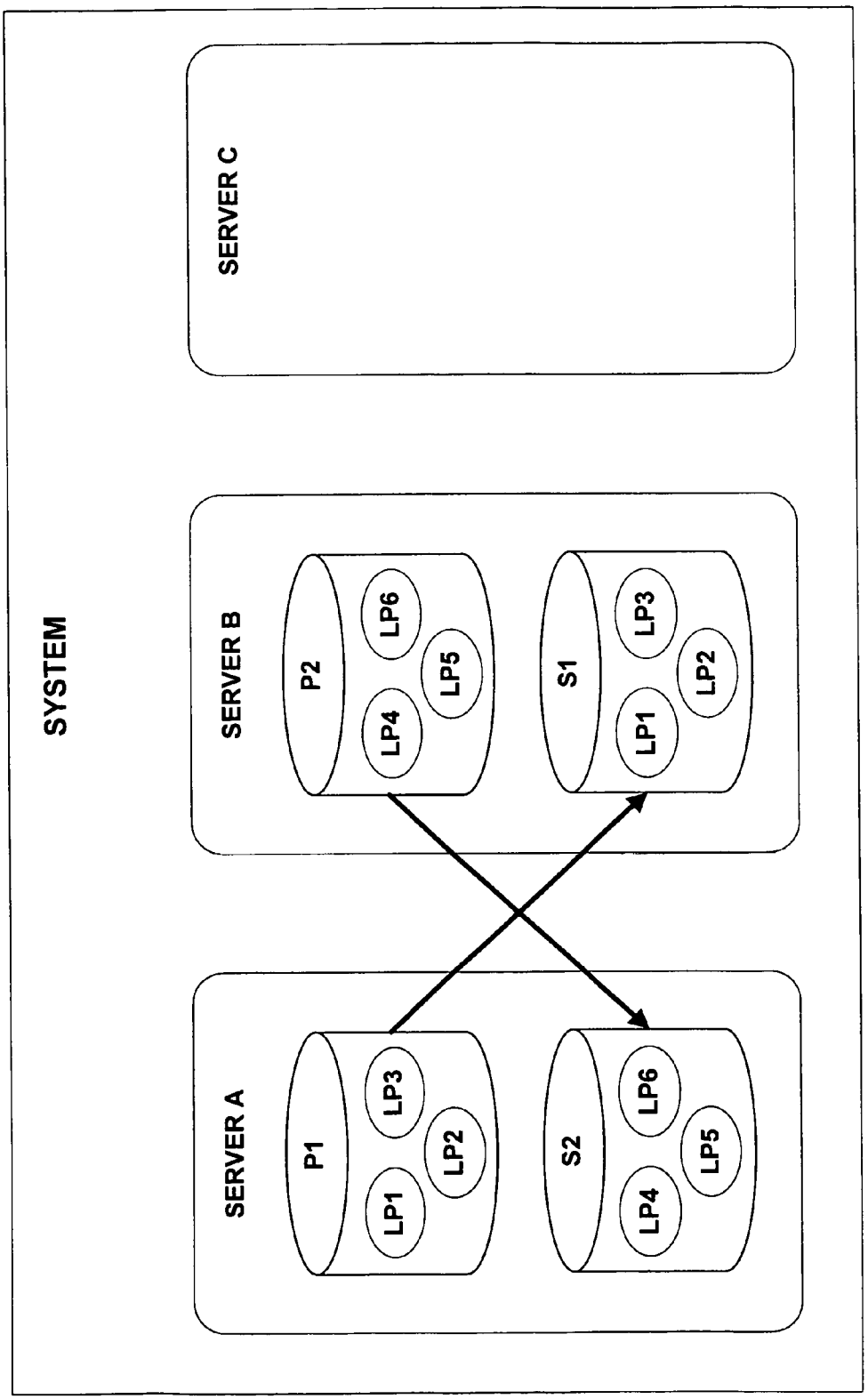
FIG. 5A is an block diagram of a federation of servers to which a new server has been added.

To increase both accessibility and scale of the System disclosed in FIG. 3, a new server S3 is added to the System as illustrated in FIG. 5A and employing the method illustrated in the flowchart of FIG. 4. Referring first to FIG. 5A, and after the addition of the new server S3, the System now comprises three servers: Server A, Server B, and Server C. Server A comprises data structures P1 and S2; Server B comprises data structures P2 and S1; and Server C presently comprises no data structures. Data structure P1, a primary data structure, and data structure S1, the secondary data structure (and the backup copy of data structure P1), together comprise a physical partition X1 (not shown). Likewise, data structure P2, a primary data structure, and data structure S2, the secondary data structure (and the backup copy of data structure P2), together comprise physical partition X2 (not shown).

Physical partition X1 (not shown), and its data structures P1 and S1, comprise logical partitions LP1, LP2, and LP3, the primary data of which is stored in the P1 data structure and the identical backup or secondary data of which is stored in the S1 data structure. Likewise, physical partition X2 (not shown), and is data structures P2 and S2, comprise logical partitions LP4, LP5, and LP6, the primary data of which is stored in the P2 data structure and the identical backup or secondary data of which is stored in the S2 data structure. Therefore the logical partition LP1, for example, comprises both the component shown located in data structure P1 (the primary data) and the component shown located in data structure S1 (the secondary data); the other logical partitions LP2-LP6 are similarly structured.

In this configuration, Server A and Server B are being actively utilized by the System while Server C is not. In the present set of embodiments, Server C is a new server that has been recently added to the System. In alternative embodiments, however, Server C might also be an existing server that is not being presently utilized by the System for any of a variety of reasons. And, as previously noted, for each physical partition, the primary data structure and the secondary data structure do not reside on the same server. Locating these data structures on different servers increases data accessibility by ensuring that, if the server having the primary data structure fails, the data is still accessible on the server hosting the secondary data structure.

To balance the load on Server A and Server B across all three servers in the System, the System must first extend the capacity of the System across all three servers. Extending the capacity of the System comprises the steps illustrated by the flowchart of FIG. 4 and illustrated by FIGS. 5A-5C.

Figure 5B:
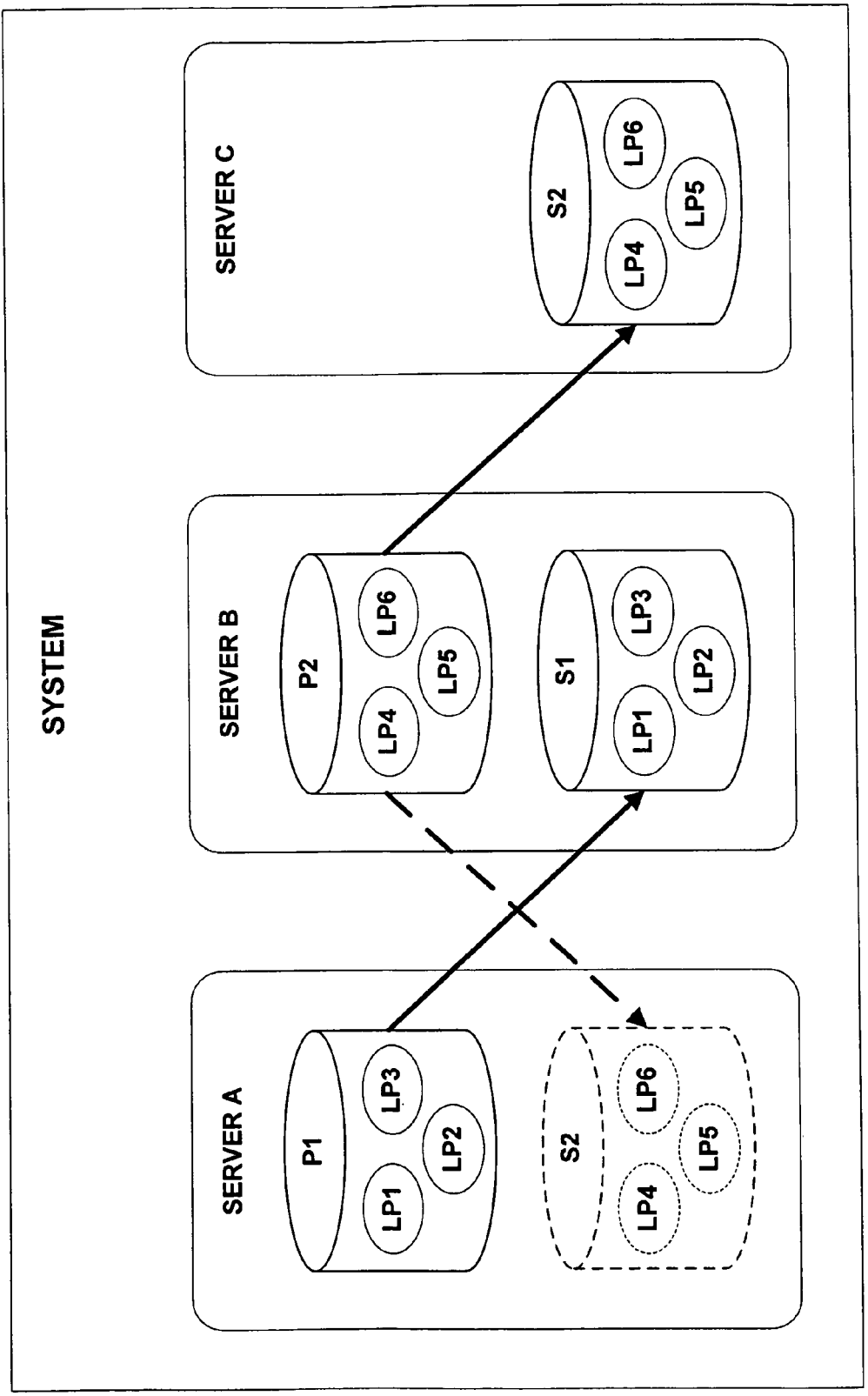
FIG. 5B is a block diagram showing the movement of data structure S2 from Server A to Server C.
Figure 5C:
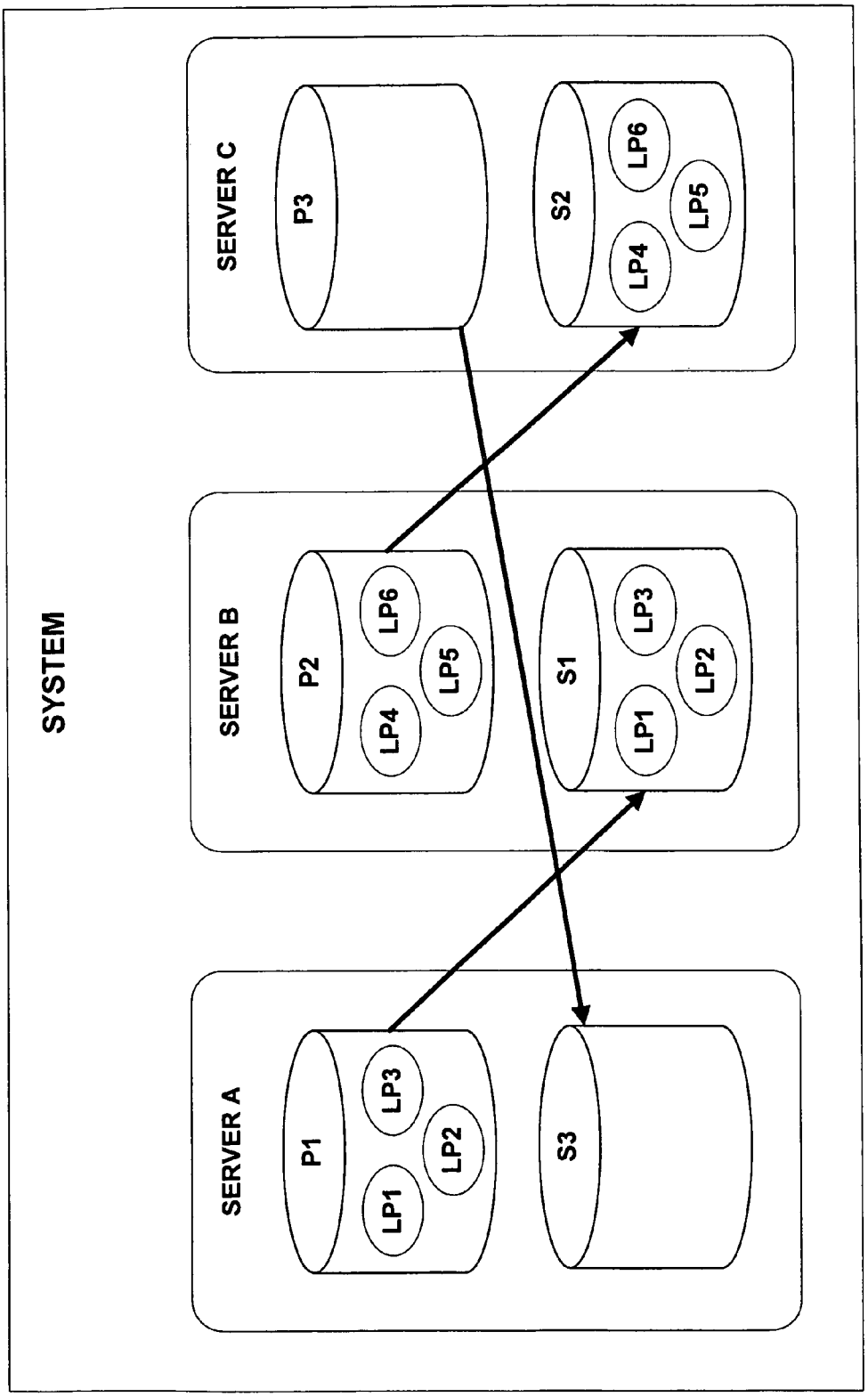
FIG. 5C is a block diagram showing the creation of data structure P3 on Server C and corresponding data structure S3 on Server A.

In the first step 402 of FIG. 4, the System selects and moves data structure S2 from Server A to Server C, as illustrated in FIG. 5B. Note that although data structure S2 has been moved to a new server, it still remains part of physical partition X2. Also note that any secondary data structure (e.g., S1, S2, . . . Sn) could have been selected by the System to be moved. Regardless, moving data structure S2 from Server A to Server C not only places data on Server C but also frees up space on Server A. Next, at step 404 of FIG. 4, the System creates a new physical partition X3 (not shown). The System then creates, at step 406, a new primary data structure P3 for the new partition X3 on Server C and, at step 408, a new secondary data structure for the new partition X3 on Server A, as illustrated in FIG. 5C.

As will be appreciated by those of skill in the relevant art, these data structure moves can be accomplished by a variety of well-known methods resulting in minimal performance impact to the System. Moreover, the order of the steps described above can be arranged in any order so long as the selected existing secondary data structure (in this case, data structure S2 on Server A) is moved to the new server before the new secondary data structure (in this case, S3 on Server A) is created on Server A.

Balancing the Data Load

After extending the capacity of a System in certain embodiments, the load can then be balanced by one of two methods illustrated by the flowcharts of FIG. 6 and FIG. 9 respectively. The first step for balancing the load in each method is, at step 602 and 902 respectively, to determine how many logical partitions to move to the new physical partition, and which specific logical partitions will in fact be moved. The most direct means of identifying how many partitions need to be moved can be derived by many means, as will be appreciated by those of skill in the relevant art. One method is to divide the total number of logical partitions by the total number of physical partitions to determine how many logical partitions need to be moved, and then selecting a roughly equal number of logical partitions from each of the preexisting physical partitions for actually moving. For example, six (the number of logical partitions) divided by three (the number of physical partitions) equals two (the number of logical partitions to be moved to the new physical partitions) which, in turn, when divided by two (the number of original physical partitions) equals one (the number of partitions to move from each preexisting physical partition to the new physical partition). If the division yields a result with a division remainder, additional logical partitions in an amount equal to the division remainder can also be selection and moved, one per physical partition, from a subset of physical partitions equal in number to the remainder or, better yet, one less in number than the remainder (which requires one less move).

Similarly, there are various techniques for determining which logical partitions to move, some of which may be based on dynamic considerations such as response latency, CPU load, IO queue depth, and so forth. Many of these techniques are utilized to address "hot spots," or asymmetric access to subsets of data, and are well known to those of skill in the art. Various embodiments of the present invention anticipate the utilization of any and all of these various techniques, and thus nothing herein should be interpreted as confining or limiting the invention to the specific techniques—the static techniques described in this specification and the claims—that are used by the embodiments described in detail herein.

Consistent with the foregoing analysis applied to the present embodiments, the system might move logical partitions L3 and L6 to new physical partition X3 for the embodiments described herein below. Of course any one of the logical partitions L1, L2, or L3 could have been selected from physical partition X1, and the same holds true for the one logical partition selected to be moved from physical partition X2. Moreover, in certain embodiments of the present method herein described, logical partitions L3 and L6 may be moved separately (one at a time) in order to provide maximum percentage availability of the Data and minimize the number of logical partitions to which writes are suspended to just one such logical partition at any given time during the move.

In order to maintain data consistency during any move process, it is important to either (a) prevent changes (writes) to the data during the short periods the data is being moved, or (b) to ensure that changes are reflected and deconflicted following any such move. The suitability of the specific method employed generally depends on the nature of the System: the former method is best applied to "single-master" System embodiments, whereas the latter method is best applied to "multi-master" System embodiments. Each method is discussed below.

Single-Master System Method

A single-master system embodiment only allows changes (writes) to the primary data structure. By restricting rights to this single location, the System need only update the backup data structures by immediately streaming the changes made to the primary data structure to the backup data structures. By preserving the integrity of the data during the move, the single-master method does not require any conflict reconciliation for data changes that might otherwise occur during the move and not be immediately reflected in the data. However, it is important to note a limitation of the single-master method is that, since it temporarily prevents writes to the data being moved, the multi-master method is the preferred method for any embodiment that requires full-time, no-interruption changeability (writeability) of the entire body of Data.

Figure 7A:
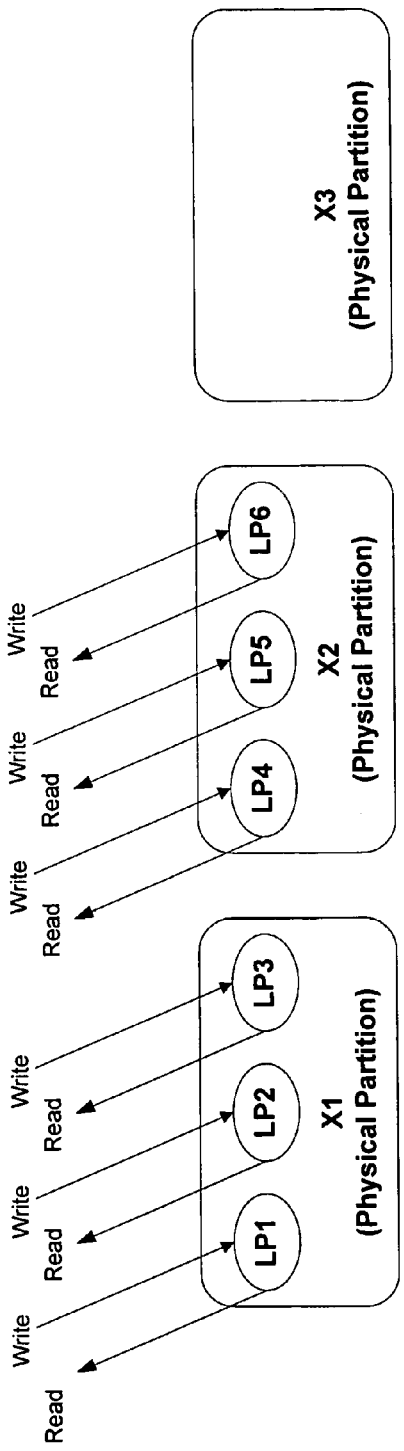
FIG. 7A is a block diagram of the physical partitions of the extended federation of servers (including the newly-created X3 physical partition).
Figure 7B:
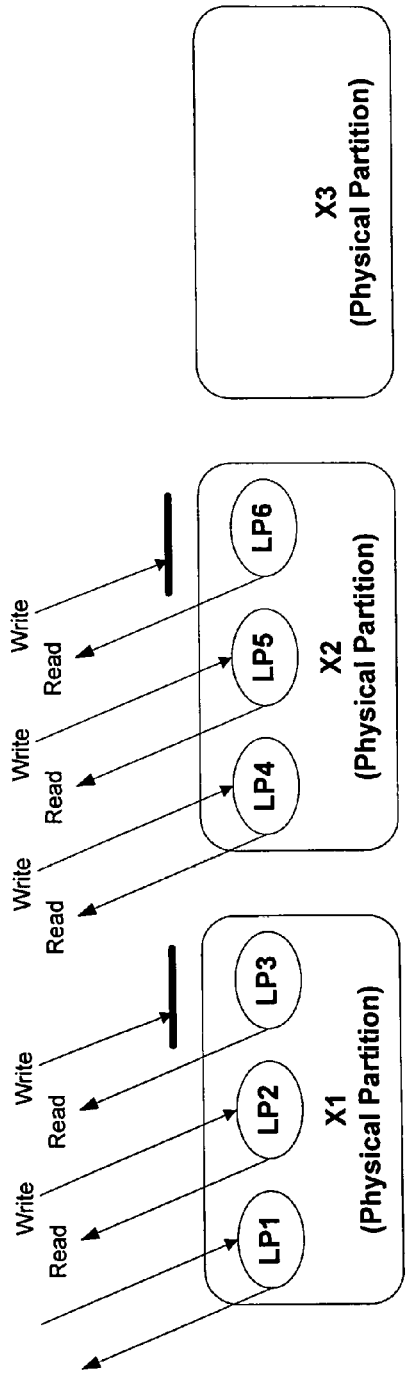
FIG. 7B is a block diagram illustrating the suspension of writes to logical partitions selected to be moved to physical partition X3.

Focusing solely on the logical partitions and the physical partitions, FIG. 7A illustrates the location of the logical partitions in the physical partitions immediately following the creation of the new but empty physical partition X3 (previously discussed). To conduct the move in a single-master system, the next step, step 604 of FIG. 6 and as reflected in FIG. 7B, is to suspend changes to the data of logical partitions L3 and L6 in order to enable the movement of an entirely accurate copy of these logical partitions from their present physical partitions X1 and X2 respectively to their new physical partition X3. In one set of embodiments, while attempts to read the data in logical partitions L3 and L6 will continue to be permitted (as shown), a process attempting to make changes to the data of logical partition L3 and L6 will receive an error which the process can then handle as appropriate (e.g., by attempting the write again at a later time). In another set of embodiments, changes to the data will be paused and maintained in queue ("in the pipeline") during the period of suspension, and then eventually allowed to flow to the data in its new location once the move is complete. These methods and many others for temporarily suspending changes to the data—and, if necessary, the mechanisms by which errors resulting from doing so are handled—are numerous and well known by those possessing skill in the relevant art.

After changes to the data of logical partitions L3 and L6 are suspended, and at step 606 of FIG. 6 and as illustrated in FIG. 7C, these logical partitions are then copied to physical partition X3. Once copied, at steps 608 and 610, as well as being illustrated in FIG. 7D, processes attempting to access data in logical partitions L3 and L6 are then directed to the new copies of the logical partitions L3 and L6 now resident in physical partition X3 and, thereafter, the old logical partitions L3 and L6 are deleted from physical partitions X1 and X2 respectively.

Figure 8:
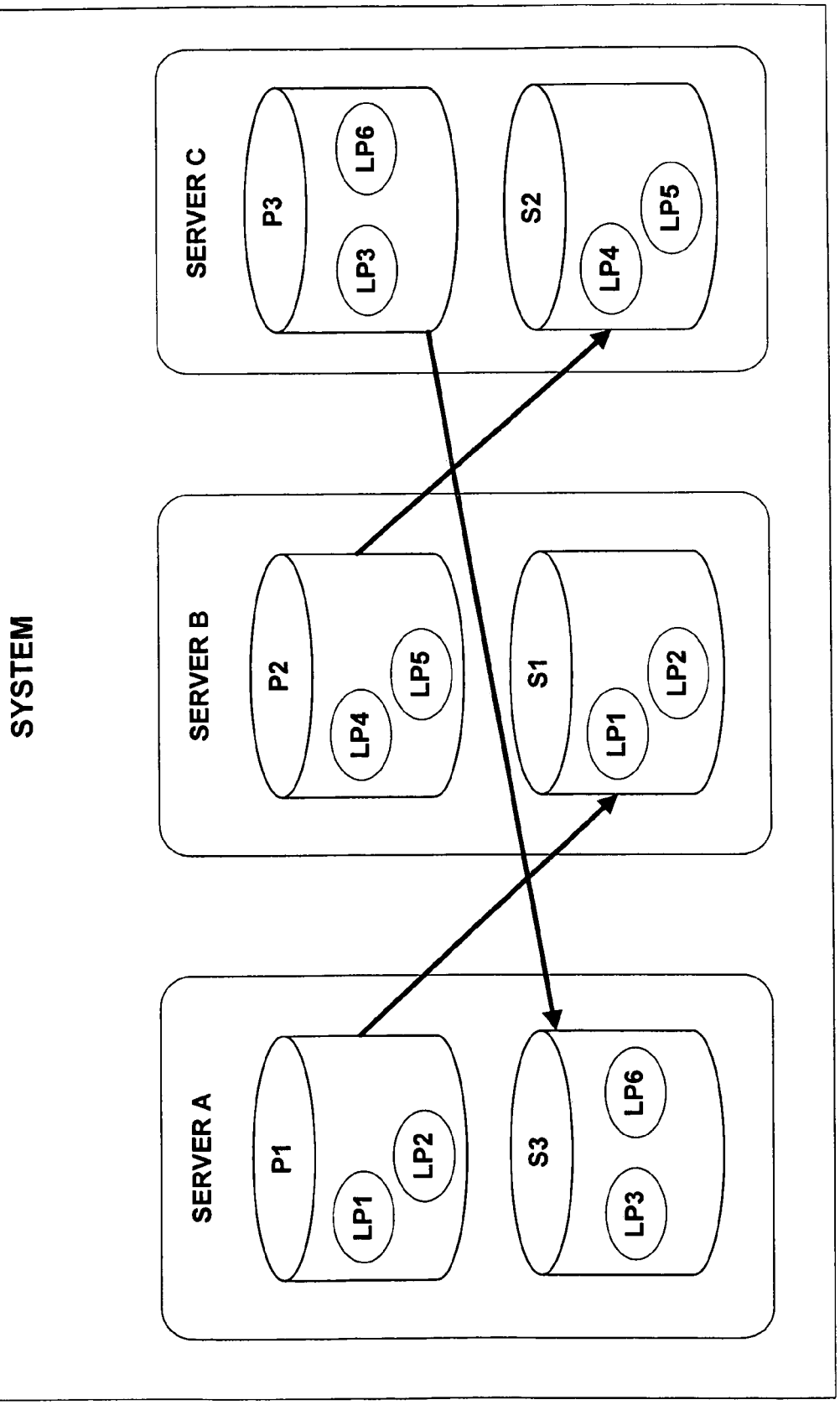
FIG. 8 shows the relative locations of logical data after the application of the balancing methods described herein.

To put the end result of this process into perspective, and referring to FIG. 8, it should be noted that the data moved was copied to the primary data structure of the new physical partition on Server C and to the secondary data structure on Server A, again ensuring enhanced accessibility in the event of a single server failure.

Multi-Master System Method

A multi-master System embodiment, unlike the single-master method, always allows and accepts changes to the data, even during the move, by replicating the changes received and applied at the old data location and applying them a second time to the new data location. Any conflicts arising from this twice-written approach are then resolved in the new data location once the move is completed by one of many methodologies known and appreciated by those of skill in the relevant art. Moreover, while the single-master method is not compatible with a multi-master System, the multi-master method is always compatible with a single-master system but is unlikely to be more efficient in most (if not all) single-master embodiments because of the need to reconcile any inconsistencies in the data following the move.

To conduct the move in a multi-master system, the next step, step 904 of FIG. 9 and as illustrated in FIG. 10A, is to create temporary replication streams from the original logical partitions L3 and L6 to the new physical partition X3 in order to ensure that all changes made to the data of these logical partitions during the move are reflected in the logical partitions after the moves complete. In essence, this means that all changes intended for logical partitions L3 and L6 will be, for a time, occurring in both the old and new physical partitions for each.

Figure 10B:
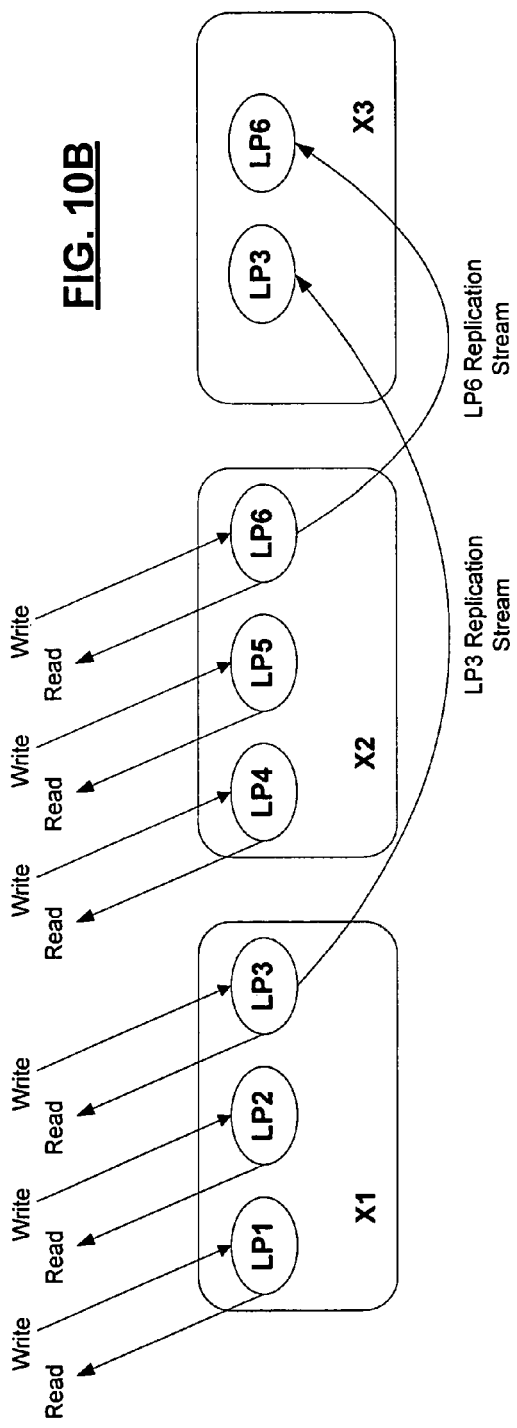
FIG. 10B is a block diagram illustrating the copying of the selected logical partitions (LP3 and PL6 from physical partitions X1 and X2 respectively) to the new physical partition X3.
Figure 10C:
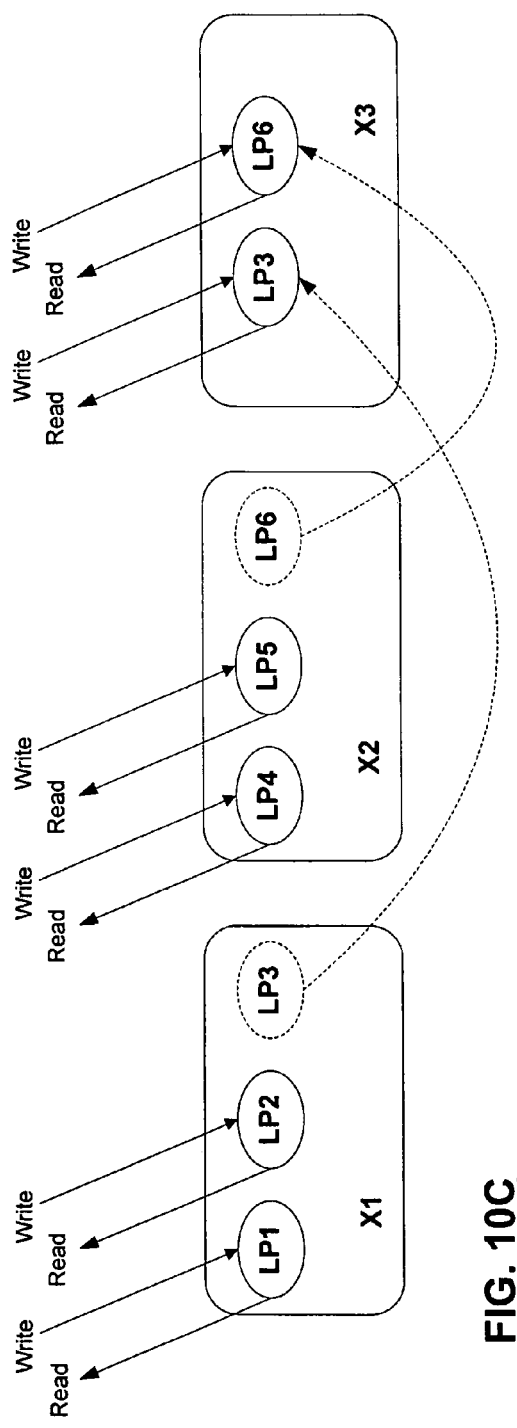
FIG. 10C is a block diagram illustrating the redirection of read and write to the new location for the moved physical partitions and the deletion of the temporary replication streams and the logical partitions in their original locations.

After the replication streams are established, at step 906 and as further illustrated in FIG. 10B, the next task is to copy the logical partitions L3 and L6 from their present physical partitions X1 and X2 respectively to their new physical partition X3. During this copy process, conflict resolution logic is utilized to reconcile any conflicts that arise between changes arriving at physical partition X3 but were not reflected in the logical partition as copied, the means for which is well-developed and fully appreciated by those of skill in the relevant art. Once the logical partitions are copied to the new physical partition X3, at step 908 and as reflected in the illustration of FIG. 10C, processes attempting to access data in logical partitions L3 and L6 are hereafter directed to the new copies of the logical partitions now resident in physical partition X3 and, at step 910, the old logical partitions L3 and L6 are deleted from physical partitions X1 and X2 respectively, as are the temporary replications streams.

In regard to copying the logical partitions L3 and L6 to the new physical partition X3, it should again be noted that the data was copied to the primary data structure of the new physical partition on Server C and the secondary data structure on Server A to ensure enhanced accessibility in the event of a single server failure.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed is:

1. A method for extending the capacity of a federation of servers comprising at least two servers, wherein a first set of data in a first data structure is stored on a first server, and a backup of the first set of data in a first backup data structure is stored on a second server, said method comprising:
adding a new server;
creating a first temporary replication stream operable to replicate in the new server, during a move of the first backup data structure, any changes that are carried out on the first backup data structure as stored on the second server;
moving the first backup data structure as stored on the second server to the new server by copying the first backup data structure from the second server to the new server while changes are being made to the first backup data structure as stored on the second server during the copying, the copying being performed by way of a copying stream separate from the first temporary replication stream, and by forwarding by way of the first temporary replication stream the changes to the first backup data structure as it is being copied to and stored on the new server;

reconciling conflicts that arise between the first backup data structure as being copied to and stored on the new server and forwarded changes arriving at the new server by way of the first temporary replication stream, each conflict arising when an arriving change is with regard to a portion of the first backup data structure not already copied to and stored on the new server;

creating a second data structure on the new server; and creating a second backup data structure for the second data structure on the second server.

2. The method of claim 1 creating a second temporary replication stream operable to replicate in the new server, during a move of a data structure, any changes that are carried out on the first data structure stored on the first server.

3. The method of claim 1 wherein the first data structure and the first backup data structure together comprise a first physical partition.

4. The method of claim 3 wherein the first physical partition comprises a first plurality of logical partitions.

5. The method of claim 4 wherein each of said first plurality of logical partitions comprise a subset of the first set of data in one data structure and a backup subset of the backup of the first set of data in another data structure.

6. The method of claim 3 wherein the second data structure and the second backup data structure comprise a second physical partition.

7. The method of claim 6 wherein the first physical partition comprises a first plurality of logical partitions, and the second physical partition comprises a second plurality of logical partitions.

8. The method of claim 7 wherein each of said first plurality of logical partitions comprise a subset of the first set of data in one data structure and a backup subset of the backup of the first set of data in another data structure, and wherein each of said second plurality of logical partitions comprise a subset of a second set of data in one data structure and a backup subset of the backup of the second set of data in another data structure.

9. An extendable federation-of-servers system, said system comprising:

at least two original servers, wherein a first set of data in a first data structure is stored on a first server, and a backup of the first set of data in a first backup data structure is stored on a second server;

a new server;

means for creating a first temporary replication stream operable to replicate in the new server, during a move of the first backup data structure, any changes that are carried out on the first backup data structure as stored on the second server;

means for moving the first backup data structure as stored on the second server to the new server by copying the first backup data structure from the second server to the new server while changes are being made to the first backup data structure as stored on the second server during the copying, the copying being performed by way of a copying stream separate from the first temporary replication stream, and by forwarding by way of the first temporary replication stream the changes to the first backup data structure as it is being copied to and stored on the new server;

means for reconciling conflicts that arise between the first backup data structure as being copied to and stored on the new server and forwarded changes arriving at the new server by way of the first temporary replication stream, each conflict arising when an arriving change is with regard to a portion of the first backup data structure not already copied to and stored on the new server;

means for creating a second data structure on the new server; and means for creating a second backup data structure for the second data structure on the second server.

10. The system of claim 9 wherein the first data structure, the first backup data structure, the second data structure, and the second backup data structure comprise databases.

11. The system of claim 9 wherein the first data structure and the first backup data structure together comprise a first physical partition.

12. The system of claim 11 wherein the first physical partition comprises a first plurality of logical partitions.

13. The system of claim 12 wherein each of said first plurality of logical partitions comprise a subset of the first set of data in one data structure and a backup subset of the backup of the first set of data in another data structure.

14. The system of claim 11 wherein the second data structure and the second backup data structure comprise a second physical partition.

15. The system of claim 14 wherein the first physical partition comprises a first plurality of logical partitions, and the second physical partition comprises a second plurality of logical partitions.

16. The system of claim 15 wherein each of said first plurality of logical partitions comprise a subset of the first set of data in one data structure and a backup subset of the backup of the first set of data in another data structure, and wherein each of said second plurality of logical partitions comprise a subset of the second set of data in one data structure and a backup subset of the backup of the second set of data in another data structure.

17. A computer-readable medium for use with an extendable federation-of-servers system comprising servers wherein a first set of data in a first data structure is stored on a first server and a backup of the first set of data in a first backup data structure is stored on a second server, and further comprising a new server; said computer-readable medium having computer-readable instructions for:

creating a first temporary replication stream operable to replicate in the new server, during a move of the first backup data structure, any changes that are carried out on the first backup data structure as stored on the second server;

moving the first backup data structure as stored on the second server to the new server by copying the first backup data structure from the second server to the new server while changes are being made to the first backup data structure as stored on the second server during the copying, the copying being performed by way of a copying stream separate from the first temporary replication stream, and by forwarding by way of the first temporary replication stream the changes to the first backup data structure as it is being copied to and stored on the new server;

reconciling conflicts that arise between the first backup data structure as being copied to and stored on the new server and forwarded changes arriving at the new server by way of the first temporary replication stream, each conflict arising when an arriving change is with regard to a portion of the first backup data structure not already copied to and stored on the new server;

creating a second data structure on the new server; and creating a second backup data structure for the second data structure on the second server.

18. The computer-readable instructions of claim 17 wherein the first data structure, the first backup data structure, the second data structure, and the second backup data structure comprise databases.

19. The computer-readable instructions of claim 17 wherein, in regard to the system:

the first data structure and the first backup data structure together comprise a first physical partition;

the second data structure and the second backup data structure comprise a second physical partition;

the first physical partition comprises a first plurality of logical partitions;

the second physical partition comprises a second plurality of logical partitions;

each of said first plurality of logical partitions comprise a subset of the first set of data in one data structure and a backup subset of the backup of the first set of data in another data structure; and each of said second plurality of logical partitions comprise a subset of the second set of data in one data structure and a backup subset of the backup of the second set of data in another data structure.

20. The computer-readable instructions of claim 17 further comprising computer-readable instructions for permitting read operations upon the first backup data structure stored on the second server when the first backup data structure is being moved.

\* \* \* \* \*